United States Patent
Saga

(10) Patent No.: US 12,280,364 B2
(45) Date of Patent: Apr. 22, 2025

(54) COMPLEX COMPOUND AND METHOD FOR MANUFACTURING THE SAME

(71) Applicant: MARUZEN PETROCHEMICAL CO., LTD., Tokyo (JP)

(72) Inventor: Yuta Saga, Ichihara (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 17/595,443

(22) PCT Filed: Nov. 26, 2020

(86) PCT No.: PCT/JP2020/043947
§ 371 (c)(1),
(2) Date: Nov. 17, 2021

(87) PCT Pub. No.: WO2021/106981
PCT Pub. Date: Jun. 3, 2021

(65) Prior Publication Data
US 2022/0212177 A1   Jul. 7, 2022

(30) Foreign Application Priority Data
Nov. 27, 2019 (JP) ................................. 2019-214682

(51) Int. Cl.
*C08J 9/28* (2006.01)
*B01J 31/16* (2006.01)
*B01J 31/24* (2006.01)

(52) U.S. Cl.
CPC ....... *B01J 31/2409* (2013.01); *B01J 31/1658* (2013.01)

(58) Field of Classification Search
None
See application file for complete search history.

(56) References Cited

U.S. PATENT DOCUMENTS

| | | | |
|---|---|---|---|
| 3,708,462 A | 1/1973 | McKinley et al. | |
| 5,258,454 A | 11/1993 | Berg et al. | |
| 5,369,133 A * | 11/1994 | Ihm | C08J 9/20 521/134 |
| 5,373,053 A | 12/1994 | Berg et al. | |
| 2005/0113602 A1 | 5/2005 | Kessinger et al. | |
| 2006/0293310 A1 | 12/2006 | Abouabdellah et al. | |
| 2009/0215965 A1 | 8/2009 | Perrier | |
| 2010/0160574 A1 | 6/2010 | Perrier | |
| 2011/0172432 A1* | 7/2011 | Le Drian | B01J 31/2447 549/80 |
| 2018/0369799 A1 | 12/2018 | Sakugawa et al. | |
| 2019/0263847 A1 | 8/2019 | Kinami et al. | |

FOREIGN PATENT DOCUMENTS

| | | |
|---|---|---|
| CN | 108305535 A | 7/2018 |
| CN | 108368142 A | 8/2018 |
| GB | 1 330 644 A | 9/1973 |
| JP | S46-21642 B1 | 6/1971 |
| JP | S48-28273 B1 | 8/1973 |
| JP | 1 330 644 A | 9/1973 |
| JP | H04-501709 A | 3/1992 |
| JP | 2004-026655 A | 1/2004 |
| JP | 2004-075688 A | 3/2004 |
| JP | 2005-132841 A | 5/2005 |
| JP | 2005-232060 A | 9/2005 |
| JP | 2007-515538 A | 6/2007 |

(Continued)

OTHER PUBLICATIONS

Inada et al. Tetrahedron, 56, 8661-8664 (Year: 2000).*
Chinchilla (Merrifield-diphenylphosphine Palladium Complexes, Encyclopedia of Reagents for Organic Synthesis (EROS), published Sep. 15, 2008 (Year: 2008).*
Ihm et al. Korean J. of Chem. Eng., 14(2), 125-128 (Year: 1997).*
Hanaoko et al., Catalysis Letters, 1994, 28, 337-342 (Year: 1994).*
International Search Report and Written Opinion (Application No. PCT/JP2020/043947) dated Feb. 9, 2021 (with English translation).
Tieqiao Chen et al., "Selective Addition of P(O)—H Bonds to Alkynes Catalyzed by Transition Metals Immobilized on Polystyrene-bound Triphenylphosphine," *Chemistry Letters*, vol. 42, No. 9, Jun. 6, 2013, pp. 1065-1067.

(Continued)

*Primary Examiner* — Yun Qian
(74) *Attorney, Agent, or Firm* — BURR PATENT LAW, PLLC

(57) ABSTRACT

[Problem] To provide a complex compound useful as a catalyst for a hydrophosphorylation reaction and a process for producing the same.

[Means to Solve the Problem] A complex compound of the present invention is a complex compound of a resin fine particle represented by the following general formula (1):

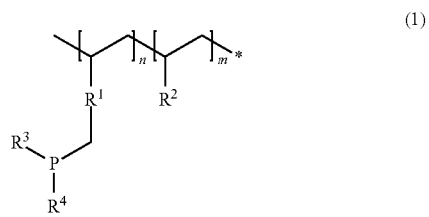

(1)

wherein, $R^1$ represents a substituted or unsubstituted hydrocarbon group, $R^2$ represents a substituted or unsubstituted alkyl group or a substituted or unsubstituted aryl group, $R^3$ and $R^4$ each independently represent a hydrogen atom, a substituted or unsubstituted alkyl group or a substituted or unsubstituted aryl group, and based on the total of 100% of the values of n and m, the value of n is within the range of 20 to 100%, the value of m is within the range of 0 to 80%, and * represents bonding with the surface of the resin fine particle and a transition metal.

19 Claims, 4 Drawing Sheets

(56) References Cited

FOREIGN PATENT DOCUMENTS

| JP | 2007-519628 A | | 7/2007 |
|---|---|---|---|
| JP | 2010-126639 A | | 6/2010 |
| JP | 2010-524661 A | | 7/2010 |
| WO | WO 2002070130 A | * | 9/2002 |
| WO | 2017/043552 A1 | | 3/2017 |

OTHER PUBLICATIONS

English translation of the International Preliminary Report on Patentability (Chapter I) dated Jun. 9, 2022 (Application No. PCT/JP2020/043947).
Chinese Office Action (Application No. 202080006756.0) dated Jul. 6, 2022 (with English translation).
Han et al., "*Efficient and Selective Nickel-Catalyzed Addition of H—P(O) and H—S Bonds to Alkalynes*," Journal of American Chemical Society, vol. 126, Jan. 1, 2004 (Jan. 1, 2004), pp. 5080-5081.
Extended European Search Report dated Jan. 22, 2024 (Application No. 20894359.7).
Japanese Office Action (with English translation) dated Sep. 20, 2024 (Application No. 2021-518804).
Japanese Office Action (with English translation) dated Jan. 24, 2025 (Application No. 2021-518804).

* cited by examiner

COMPLEX COMPOUND AND METHOD FOR MANUFACTURING THE SAME

BACKGROUND OF THE INVENTION

Field of the Invention

The present invention relates to a complex compound. More particularly, the present invention relates to a complex compound that is useful as a catalyst for a hydrophosphorylation reaction. The present invention also relates to a method for manufacturing such complex compound.

Background Art

An organophosphorus compound is a chemical substance widely used in various products such as a flame-retardant, a plasticizer, an insecticide, medical and agrochemical agents, a ligand of a metallic complex. Recently, organophosphorus compounds have been drawing attention industrially in the fields of constituting materials and electronic materials such as a metal surface treatment agent and a flame-retardant resin as functional materials.

SUMMARY OF THE INVENTION

Among the organophosphorus compounds, an alkenylphosphonic acid derivative is a useful precursor substance for the various chemicals described above, and therefore, conventionally various manufacturing methods have been studied. For example, an alkenylphosphonic acid derivative has been manufactured by addition reaction of P(O)—H bond of phosphonic acid to alkynes using a catalyst (hereinafter referred to as hydrophosphorylation reaction). For example, in Non-Patent Document 1, it is proposed to perform a hydrophosphorylation reaction using a catalyst in which a transition metal is immobilized on a polystyrene resin to which triphenylphosphine is bonded.

PRIOR ART DOCUMENTS

Non-Patent Document 1: Chem. Lett. 2013, 42, 1065-1067

SUMMARY OF THE INVENTION

Problems to be Solved by the Invention

However, in the catalyst described in Non-Patent Document 1 in which a transition metal is immobilized on a polystyrene resin to which triphenylphosphine is bonded, there was a problem that since the phosphorus content of the resin surface is not sufficient, a very large amount of resin was required in order to add phosphorus in an amount necessary for the reaction, also the reaction efficiency was low, and further, since leaching of metal components occurred frequently from the resin surface, side reactions proceeded more. Thus, there was room for improvement in reaction efficiency when used in a hydrophosphorylation reaction.

Accordingly, the problem to be solved of the present invention is to provide a complex compound useful as a catalyst for a hydrophosphorylation reaction.

Means for Solving the Problem

As a result of intensive studies to solve the above problem, the present inventors have found that a complex compound useful as a catalyst for a hydrophosphorylation reaction can be obtained by reacting a resin having a phosphine substituent on the surface with a transition metal, and have completed the present invention.

That is, according to the present invention, the following invention is provided.

[1] A complex compound of a resin fine particle represented by the following general formula (1):

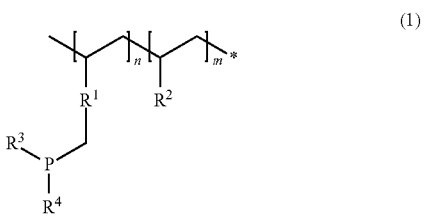

wherein, $R^1$ represents a substituted or unsubstituted hydrocarbon group, $R^2$ represents a substituted or unsubstituted alkyl group or a substituted or unsubstituted aryl group, $R^3$ and $R^4$ each independently represent a hydrogen atom, a substituted or unsubstituted alkyl group or a substituted or unsubstituted aryl group, and based on the total of 100% of the values of n and m, the value of n is within the range of 20 to 100%, the value of m is within the range of 0 to 80%, and * represents bonding with the surface of the resin fine particle and a transition metal.

[2] The complex compound according to [1], wherein the substance amount ratio of the phosphine group and the transition metal in the resin fine particle is 10:1 to 1:2.

[3] The complex compound according to [1] or [2], wherein, $R^1$ in general formula (1) is a hydrocarbon group having 6 to 12 carbons.

[4] The complex compound according to any one of [1] to [3], wherein, $R^2$ in general formula (1) is an alkyl group having 1 to 8 carbons or an aryl group having 5 to 12 carbons.

[5] The complex compound according to any one of [1] to [4], wherein, $R^3$ and $R^4$ in general formula (1) are an alkyl group having 1 to 8 carbons or an aryl group having 5 to 12 carbons.

[6] The complex compound according to any one of [1] to [5], wherein the transition metal is nickel or palladium.

[7] The complex compound according to any one of [1] to [6], used as a catalyst for a hydrophosphorylation reaction.

[8] A method for manufacturing a complex compound, comprising the step of reacting a resin fine particle represented by the following general formula (1):

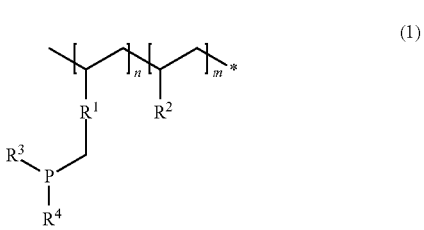

wherein, $R^1$ represents a substituted or unsubstituted hydrocarbon group, $R^2$ represents a substituted or unsubstituted alkyl group or a substituted or unsubstituted aryl group, $R^3$ and $R^4$ each independently represent a hydrogen atom, a substituted or unsubstituted alkyl group or a substituted or unsubstituted aryl group, and based on the total of 100% of the values of n and m, the value of n is within the range of 20 to 100%, the value of m is within the range of 0 to 80%, and * represents bonding with the surface of the resin fine particle, with a transition metal compound, in the presence of an organic solvent.

[9] The method for manufacturing a complex compound according to [8], wherein the transition metal compound is a zero valent nickel compound.

[10] The method for manufacturing a complex compound according to [9], wherein the zero valent nickel compound is at least one selected from the group consisting of bis(1, 5-cyclooctadiene) nickel (0), tetrakis(triphenylphosphine) nickel (0), and nickel carbonyl.

Effect of the Invention

The present invention can provide a complex compound useful as a catalyst for a hydrophosphorylation reaction and the method for manufacturing thereof. The complex compound of the present invention is capable as a catalyst of efficiently promoting the hydrophosphorylation reaction under a temperature condition of equal to or higher than the room temperature. In addition, since raw materials that are inexpensive and commercially available can be used for the complex compound of the present invention, it is possible to reduce the manufacturing cost.

MODE FOR CARRYING OUT THE PRESENT INVENTION

[Complex Compound]

Figure 1:
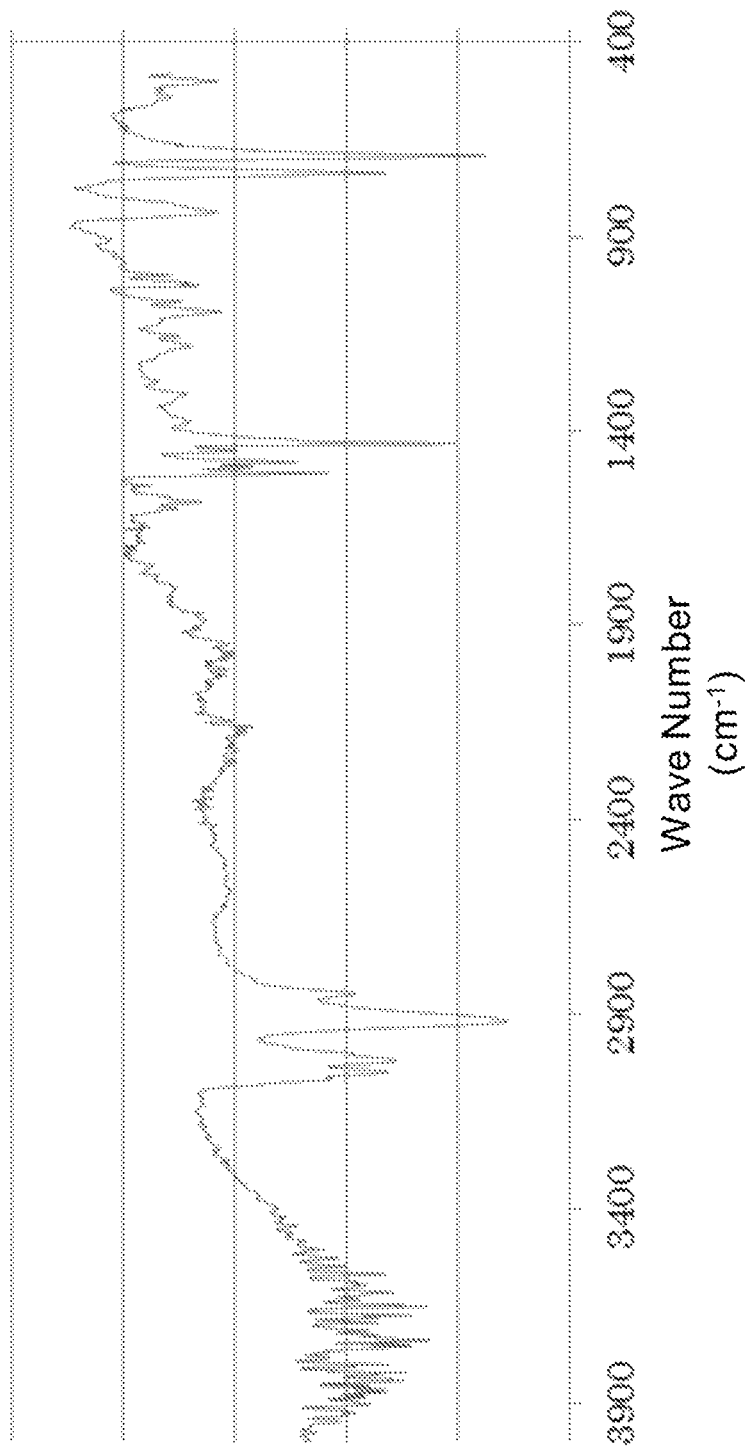
FIG. 1 represents an IR spectrum of resin fine particles (I).

The complex compound of the present invention is a complex compound of a resin fine particle and a transition metal described in details below (resin-supported transition metal complex), and can be used as a catalyst for a hydrophosphorylation reaction. Since such complex compound has a phosphine substituent at a high concentration on the surface of the resin fine particles, the hydrophosphorylation reaction can be efficiently carried out under a temperature condition of equal to or higher than the room temperature.

(Resin Fine Particle)

A resin fine particle forming the complex compound is represented by the following general formula (1):

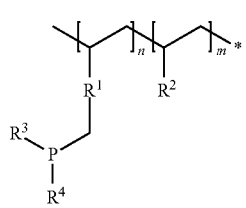

(1)

wherein, $R^1$ represents a substituted or unsubstituted hydrocarbon group, $R^2$ represents a substituted or unsubstituted alkyl group or a substituted or unsubstituted aryl group, $R^3$ and $R^4$ each independently represent a hydrogen atom, a substituted or unsubstituted alkyl group or a substituted or unsubstituted aryl group, and based on the total of 100% of the values of n and m, the value of n is within the range of 20 to 100%, the value of m is within the range of 0 to 80%, and * represents bonding with the surface of the resin fine particle.

In general formula (1), the substituted or unsubstituted hydrocarbon group for $R^1$ is preferably a hydrocarbon group having 6 to 12 carbons. The number of carbons in the substituent is not included in the above-described number of carbons. Examples of the hydrocarbon group having 6 to 12 carbons include alkylene groups such as hexylene groups, heptylene groups, and octylene groups, cycloalkylene groups such as cyclohexylene groups, and aromatic hydrocarbon groups such as phenylene groups and naphthylene groups. Among these, $R^1$ is preferably an aromatic hydrocarbon group, and more preferably a phenylene group.

In general formula (1), the substituted or unsubstituted alkyl group for $R^2$ is preferably an alkyl group having 1 to 8 carbons, and the substituted or unsubstituted aryl group is preferably an aryl group having 5 to 12 carbons. The number of carbons above does not include the number of carbons of the substituent. Examples of an alkyl group having 1 to 8 carbons include a methyl group, ethyl group, propyl group, isopropyl group, n-butyl group, isobutyl group, sec-butyl group, tert-butyl group, pentyl group, hexyl group, and the like. Examples of the aryl group having 5 to 12 carbons include a phenyl group, tolyl group, xylyl group, naphthyl group, and the like. Among these, $R^2$ is preferably an aromatic hydrocarbon group and more preferably a phenyl group.

In general formula (1), the substituted or unsubstituted alkyl group represented by $R^3$ and $R^4$ is preferably an alkyl group having 1 to 8 carbons, and the substituted or unsubstituted aryl group is preferably an aryl group having 5 to 12 carbons. The number of carbons above does not include the number of carbons of the substituent. Examples of the alkyl group having 1 to 8 carbons include a methyl group, ethyl group, propyl group, isopropyl group, n-butyl group, isobutyl group, sec-butyl group, tert-butyl group, pentyl group and hexyl group. Examples of the aryl group having 5 to 12 carbons include a phenyl group, tolyl group, xylyl group and naphthyl group. Among these, it is preferable that $R^3$ and $R^4$ each independently represent any one of a hydrogen atom, a methyl group or a phenyl group.

In general formula (1), examples of the substituent which $R^1$, $R^2$, $R^3$, and $R^4$ may contain include an alkyl group, cycloalkyl group, alkoxy group, cycloalkoxy group, heterocyclic group, alkylidene group, amino group, silyl group, acyl group, acyloxy group, carboxyl group, cyano group, nitro group, hydroxy group, mercapto group, and oxo group. The number of carbons contained in the substituent is preferably 1 to 6, more preferably 1 to 4, and further preferably 1 to 3. $R^1$, $R^2$, $R^3$, and $R^4$ may have a fluorine atom.

Specific examples of the resin represented by formula (1) include, for example, resins represented by the following formulae.

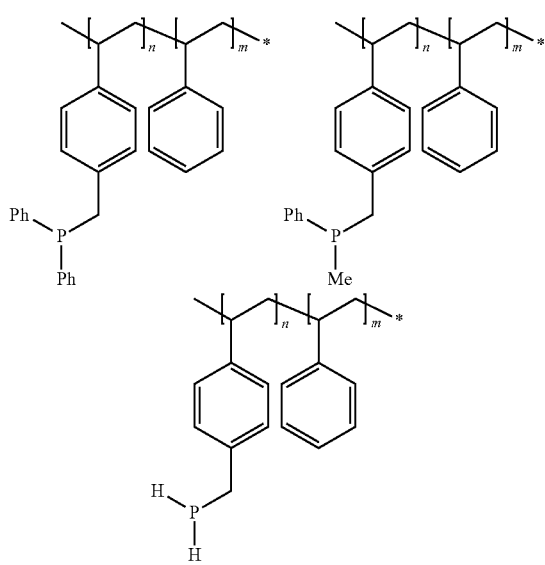

Based on the total of 100% of the values of n and m in general formula (1), the value of n is 20 to 100%, preferably 50 to 100%, more preferably 80 to 100%, and the value of m is 0 to 80%, preferably 0 to 50%, more preferably 0 to 20%.

The resin fine particle represented by general formula (1) can be manufactured by the following method. For example, the resin microparticles can be produced by adding a Merrifield resin and an alkali metal organic phosphorus compound or a trivalent organic phosphorus compound having an ester bond to a reaction vessel under a nitrogen atmosphere and conducting reaction at −20° C. to 150° C. for 1 to 48 hours. A Merrifield resin refers to a styrene/chloromethyl styrene cross-linked resin. Examples of the alkali metal organic phosphorus compound include sodium diphenylphosphide, sodium methylphenylphosphide, and the like. Examples of the trivalent organic phosphorus compound having an ester bond include triethyl phosphite, methyl diphenylphosphinate, and the like.

Further, a resin fine particle can be obtained by conducting suspension polymerization reaction of phosphinylmethylstyrene which is obtained by adding ethenyl phenylmethyl magnesium chloride and phosphine halide to a reaction vessel and conducting reaction for 1 to 48 hours at 0 to 100° C. under a nitrogen atmosphere, with styrene and a cross-linking agent.

Since the fine resin particle is bonded to the surface of the fine resin particle at *, the phosphorus content of the surface is high, preferably L3 mmol/g or more, more preferably 2.0 mmol/g or more, further preferably 2.5 mmol/g or more. The phosphorus content of the surface of the fine resin particle can be measured by elemental analysis, the amount of adsorbed organic halide compounds, and oxidation-reduction titration.

The resin fine particles can be adjusted to a desired particle size by classification by a conventionally known method or by adjusting the reaction condition. Although the sizes of the resin fine particles is not particularly limited, the average particle size is preferably 1 to 1000 μm, more preferably 10 to 100 μm, and further preferably 30 to 75 μm from the viewpoints of easiness of forming a complex with a transition metal and reaction efficiency. The average particle size of the resin fine particles can be measured using a particle size distribution measuring device of a laser diffraction type or a sieving method (JIS K 0069:1992).

(Transition Metal)

Examples of the transition metal that forms a complex compound include nickel, palladium, and rhodium, with nickel being preferred. In particular, by using a complex compound formed of the resin fine particles and nickel as a catalyst, the hydrophosphorylation reaction can proceed efficiently under the temperature condition of equal to or higher than the room temperature (20° C.) and lower than 100° C.

The substance amount ratio of the phosphine group to the transition metal in the resin fine particles is not particularly limited as long as a complex compound can be formed, and is preferably 10:1 to 1:2, more preferably 8:1 to 1:1, and further preferably 5:1 to 2:1.

[Method for Producing Complex Compound]

The method for manufacturing a complex compound of the present invention includes a step of reacting the resin fine particles represented by general formula (1) above with a transition metal compound in the presence of an organic solvent. The resin fine particles represented by general formula (1) are as described in details above.

The transition metal compound used in the method for manufacturing the complex compound is preferably a nickel compound or a palladium compound, and more preferably a zero valent nickel compound. Examples of the zero valent nickel compound include bis(1,5-cyclooctadiene)nickel (0), tetrakis (triphenylphosphine)nickel (0), and nickel carbonyl. The zero valent nickel compound can form a complex compound by using a compound having a ligand with a weaker coordinating force than phosphine present on the surface of the resin fine particles.

The reaction temperature of the resin fine particles and the transition metal compound is not particularly limited and is preferably −10 to 100° C., more preferably 0 to 60° C., further preferably 10 to 30° C., taking into consideration the reaction efficiency, reaction speed, and by-products.

The reaction time of the resin fine particles and the transition metal compound is not particularly limited and is preferably 10 minutes to 24 hours, more preferably 1 hour to 18 hours, further preferably 6 hours to 18 hours, taking into consideration the reaction efficiency, reaction speed, and by-products.

There is no particular limitation to the organic solvent used in the reaction of the resin fine particles and the transition metal compound, and examples include ethers, hydrocarbons, ketones, esters, aromatic hydrocarbons, and the like, with use of ethers such as tetrahydrofuran being preferred.

The reaction of the resin fine particles and the transition metal compound is preferably carried out in an inert gas atmosphere by taking into consideration the reaction efficiency, reaction speed, and by-products. The inert gas used is preferably nitrogen, argon, and the like.

[Hydrophosphorylation Reaction]

The above complex compound can be suitably used as a catalyst for the hydrophosphorylation reaction. In particular, it is possible to efficiently synthesize an alkenylphosphorus compound from raw materials of a phosphorus compound and an alkynyl compound, under a temperature condition of equal to or higher than room temperature.

A phosphorus compound represented by the following general formula (2) can be used as a raw material for the hydrophosphorylation reaction.

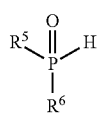
(2)

In general formula (2), $R^5$ and $R^6$ each independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group. In addition, $R^5$ and $R^6$ may be bonded to each other to form a cyclic structure.

In general formula (2), the number of carbons of the alkyl group, alkoxy group, cycloalkyl group, aralkyl group, aryl group and aryloxy group of $R^5$ and $R^6$ is preferably 1 to 10. The number of carbons above does not include the number of carbons of the substituent. Examples of $R^5$ and $R^6$ include alkyl groups such as a methyl group, ethyl group, propyl group, isopropyl group, n-butyl group, isobutyl group, sec-butyl group, pentyl group, and hexyl group; alkoxy groups such as a methoxy group, ethoxy group, and butoxy group; cycloalkyl groups such as a cyclohexyl group; aralkyl groups such as a benzyl group and phenethyl group; aryl groups such as phenyl group, tolyl group, xylyl group, and naphthyl group; and aryloxy groups such as a phenoxy group.

In general formula (2), examples of the substituent which $R^5$ and $R^6$ may have include an alkyl group, a cycloalkyl group, alkoxy group, cycloalkoxy group, heterocyclic group, alkylidene group, silyl group, acyl group, acyloxy group, carboxyl group, cyano group, nitro group, hydroxy group, mercapto group, and oxo group. The number of carbons contained in the substituent is preferably from 1 to 6, more preferably from 1 to 4, and even more preferably from 1 to 3.

An alkynyl compound represented by the following general formula (3) can be used as a raw material for the hydrophosphorylation reaction.

(3)

In general formula (3), $R^7$ and $R^8$ each independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heteroaryl group, a substituted or unsubstituted alkenyl group, a substituted or unsubstituted alkoxy group, a substituted or unsubstituted aryloxy group, or a substituted or unsubstituted silyl group.

In general formula (3), the alkyl group, cycloalkyl group, aralkyl group, aryl group, heteroaryl group, alkenyl group, alkoxy group, and aryloxy group of $R^7$ and $R^8$ preferably have 1 to 10 carbons. The number of carbons above does not include the number of carbons of the substituent. Examples of $R^7$ and $R^8$ include a methyl group, ethyl group, propyl group, isopropyl group, n-butyl group, isobutyl group, sec-butyl group, and pentyl group; alkyl groups such as a hexyl group; cycloalkyl groups such as a cyclohexyl group; aralkyl groups such as a benzyl group and a phenethyl group; aryl groups such as a phenyl group, tolyl group, xylyl group, and naphthyl group; alkenyl groups such as a 1-butenyl group, 2-butenyl group, 1,3-butadienyl group, pentenyl group, and hexenyl group; alkoxy group such as a methoxy group, ethoxy group, and butoxy group; and aryloxy groups such as a phenoxy group.

In general formula (3), examples of the substituent which $R^7$ and $R^8$ may have include an alkyl group, cycloalkyl group, alkoxy group, cycloalkoxy group, heterocyclic group, alkylidene group, silyl group, acyl group, acyloxy group, carboxyl group, cyano group, nitro group, hydroxy group, mercapto group, and oxo group. The number of carbons contained in the substituent is preferably from 1 to 6, more preferably from 1 to 4, and further preferably from 1 to 3.

(Reaction Condition)

The substance amount ratio of the phosphorus compound represented by general formula (2) to the alkynyl compound represented by general formula (3) as the raw materials for the hydrophosphorylation reaction is preferably 10:1 to 0.1:1, more preferably 3:1 to 0.7:1, and further preferably 1.1:1 to 0.9:1.

The amount of the complex compound (catalyst) used in the hydrophosphorylation reaction is not particularly limited as long as the reaction proceeds sufficiently, and is preferably 0.001 to 0.5 mol, more preferably 0.01 to 0.1 mol, and further preferably 0.025 to 0.05 mol, based on 1 mol of the phosphorus compound as a raw material.

The reaction temperature of the hydrophosphorylation reaction is not particularly limited, and is preferably 50 to 120° C., more preferably 50 to 80° C., and further preferably 50 to 60° C., upon taking into consideration of reaction efficiency, reaction rate, and by-products.

The reaction time of the hydrophosphorylation reaction is not particularly limited, and is preferably 30 minutes to 40 hours, more preferably 1 hour to 24 hours, and further preferably 4 to 18 hours, upon taking into consideration of reaction efficiency, reaction rate, and by-products.

The hydrophosphorylation reaction may be carried out with an organic solvent or without a solvent. The organic solvent used for the hydrophosphorylation reaction is not particularly limited, and examples thereof include alcohols, ethers, hydrocarbons, ketones, esters, aromatic hydrocarbons, and the like.

The hydrophosphorylation reaction is preferably carried out under an inert gas atmosphere, upon taking into consideration of reaction efficiency, reaction rates and by-products. It is preferable to use nitrogen, argon or the like as the inert gas.

(Alkenylphosphorus Compound)

In the present invention, an alkenylphosphorus compound represented by the following general formula (4) can be obtained by a hydrophosphorylation reaction.

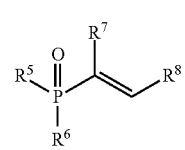
(4)

In general formula (4), $R^5$ and $R^6$ are synonymous with $R^5$ and $R^6$ in general formula (2), and $R^7$ and $R^8$ are synonymous with R' and $R^8$ in general formula (2).

EXAMPLES

The present invention shall be specifically described below with reference to the Examples and Comparative Examples; however, the present invention shall not be limited to these Examples.

<Synthesis of Complex Compound>

Example 1

Under a nitrogen atmosphere, 40 mL of tetrahydrofuran (THF) and 10.5 g of triphenylphosphine were added to a reaction vessel and stirred well. Subsequently, 7.36 g of a metallic sodium dispersion (sodium content: about 25% by mass, average particle size of metallic sodium fine particles: 10 μm, manufactured by Kobelco Eco-Solutions Co., Ltd., SD) was added to the reaction vessel and stirred at 25° C. for 18 hours to obtain sodium diphenylphosphide ($Ph_2P$—Na).

Under a nitrogen atmosphere, 9.8 g of Merrifield Resin (4.4 mmoL Cl/g, crosslinking agent: 1 mol % divinylbenzene, manufactured by Sigma-Aldrich Japan Godo Kaisha) was added to the reaction vessel in which the sodium diphenylphosphide was prepared, and reaction was conducted at 60° C. for 15 hours. After the reaction, 20 mL of 2-propanol was added dropwise to the reaction solution over 1 hour. The precipitate was taken out from the suspension into the air and washed three times with 20 mL of THF, three times with 20 mL of purified water, and one time with 20 mL of acetone. The precipitate was dried under reduced pressure at 60° C. for 18 hours, thereby obtaining resin fine particles (I) represented by the following formula.

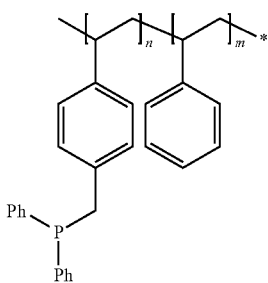

In the above-described formula, the value of n is 50% and the value of m is 50% based on a total of 100% of the values of n and m.

The phosphorus content of the surface of the obtained resin fine particles (I) was measured by the following organic halide adsorption method and was found to be 2.34 mmol/g.

(Surface Phosphorus Content Measuring Method by Organic Halide Adsorption Method)

100 mg of resin fine particles and 2.0 mL of 5.5% by mass benzyl bromide THF solution were metered in a vial and stirred for 18 hours at 60° C. The supernatant was extracted and the substance amount of benzyl bromide adsorbed with an internal standard method (standard substance: diphenyl ether) was calculated using GC-FID to obtain the phosphorous content of the resin fine particles.

The resin fine particles (I) thus obtained were passed through a 300 mesh sieve and the particles that passed were collected to obtain 15.9 g of light yellow resin fine particles.

Under a nitrogen atmosphere, 0.21 mmol of the resin fine particles (I) thus obtained and 0.05 mmol of bis(1,5-cyclooctadiene) nickel (0) were subjected to reaction in a reaction vessel for 6 hours at 25° C. in the presence of 1.0 mL of THF. The precipitate was collected and washed three times with 1.0 mL of THF to obtain complex compound (I). At this time, hardly any generation of the precipitate was confirmed when 100 mg of dimethylglyoxime was added to the supernatant. On the other hand, when only bis(1,5-cyclooctadiene)nickel (0) was dissolved in THF and then dimethylglyoxime was added, a large amount of precipitate was obtained, and therefore it is considered that bis(1,5-cyclooctadiene)nickel (0) reacted with the resin fine particles (I) to form a complex.

The obtained resin fine particles (I) were measured by IR. The obtained IR spectrum is shown in FIG. 1. As a result of confirming the IR spectrum, a peak derived from C—Cl contained in the raw material, Merrifield resin (wave number: 1295 $cm^{-1}$) disappeared, and generation of a peak derived from P—C (wave number: 694 $cm^{-1}$) was confirmed. In addition, generation of vinylphosphorus was confirmed by coordination with Ni as described above. From these results, it can be said that a chemical bond of phosphorus was formed on the surface of the resin fine particles.

Example 2

Under a nitrogen atmosphere, 132 mL of THF and 20.17 g of triphenylphosphine were added to a reaction vessel and stirred well. Subsequently, 25.4 g of a metallic sodium dispersion (sodium content: about 25% by mass, average particle size of metallic sodium fine particles: 10 μm, manufactured by Kobelco Eco-Solutions Co., Ltd., SD) was added to the reaction vessel and stirred at 25° C. for 18 hours to obtain sodium diphenylphosphide ($Ph_2P$—Na).

Next, 9.76 g of Merrifield resin (5.5 mmol Cl/g, crosslinking agent: 5 mol % divinylbenzene, particle size 16-50 mesh, manufactured by Sigma-Aldrich Japan Godo Kaisha) was added to the reaction vessel, and the mixture was allowed to react at 25° C. for 20 hours, and then 20 mL of 2-propanol was added dropwise over 1 hour, and the precipitate was taken out into the air. The precipitate was washed three times with 60 mL of THF, three times with 60 mL of water, and one time with 30 mL of acetone. This was dried with reduced pressure for 18 hours at 60° C. to obtain resin fine particles (II) represented by the following formula. The phosphorous content on the surface of the resin fine particles (II) was measured as like Example 1 and was found to be 2.96 mmol/g.

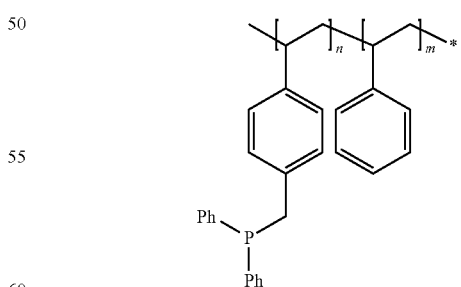

In the above-described formula, the value of n is 100% and the value of m is 0%, based on the total of 100% of the values of n and m.

In a reaction vessel, 0.21 mmol of the obtained resin fine particles (II) and 0.05 mmol of bis(1,5-cyclooctadiene) nickel (0) were reacted in the presence of 1.0 mL of THF at 25° C. for 6 hours. The precipitate was collected and washed three times with 1.0 mL of THF to obtain a complex compound (II).

Figure 2:
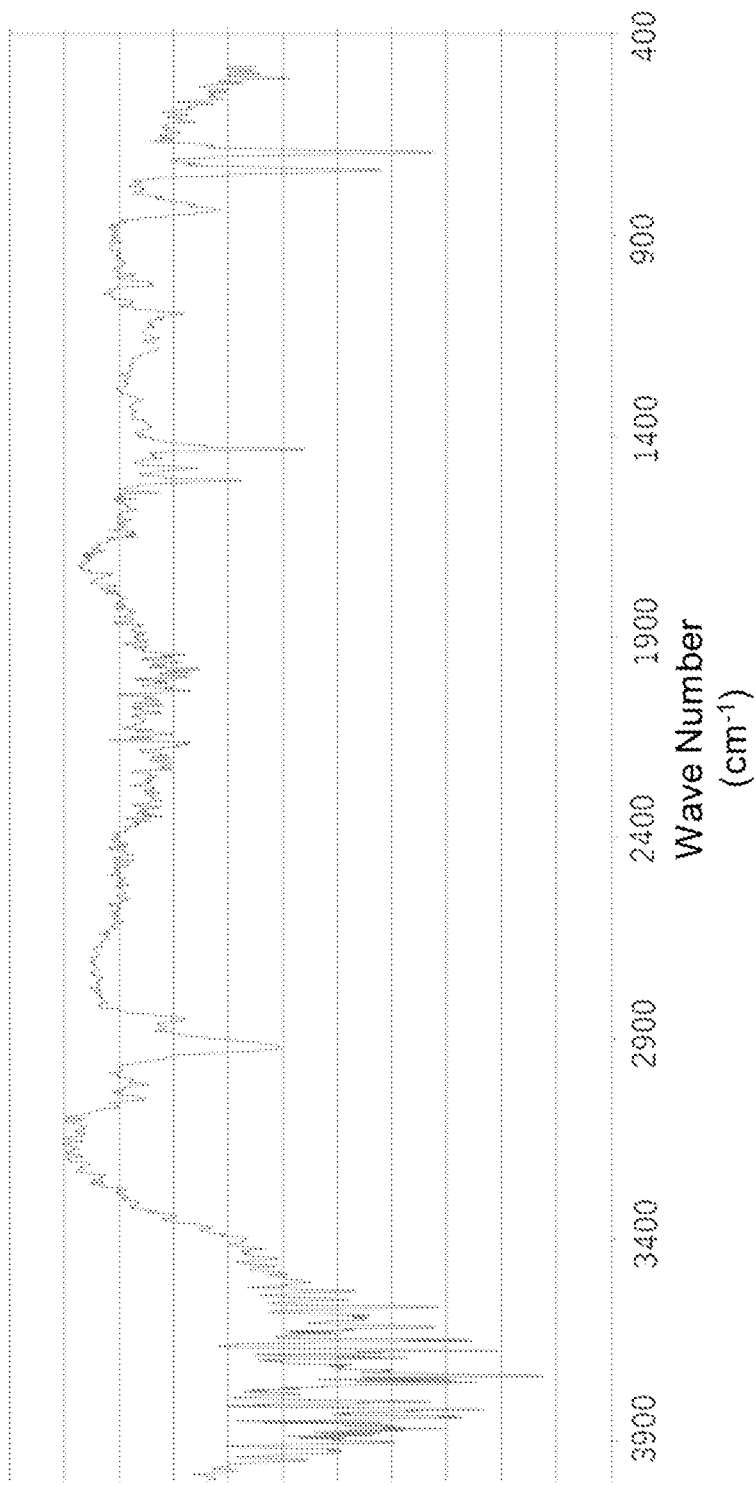
FIG. 2 represents an IR spectrum of resin fine particles (II).

The obtained resin fine particles (II) were measured by IR. The obtained IR spectrum is shown in FIG. 2. When the IR spectrum was confirmed, it was found that a peak (wave number: 1285 cm$^{-1}$) derived from C—Cl contained in the raw material, Merrifield resin has disappeared and a peak (wave number: 694 cm$^{-1}$) derived from P—C has generated. It is also confirmed that vinylphosphorus has generated by coordination with Ni as above. It can be said from these results that chemical bonding of phosphorous had been formed on the surface of the resin fine particles.

Example 3

Under an argon gas atmosphere, 30 mL of THF and 5.0 g of methyldiphenylphosphine were added to the reaction vessel. Next, 4.8 g of a metallic sodium dispersion (sodium content: about 25% by weight, average particle size of metallic sodium fine particles: 10 μm, manufactured by Kobelco Eco-Solutions Co., Ltd., SD) was added, followed by a reaction at 0° C. for 18 hours to obtain sodium methyl phenyl phosphide (MePhP—Na). The yield was 70.0% as confirmed by $^{31}$P-NMR.

3.81 g of Merrifield resin (5.5 mmol Cl/g, crosslinking agent: 5 mol % of divinylbenzene, particle size 16-50 mesh, manufactured by Sigma-Aldrich Japan Godo Kaisha) was added to the prepared sodium methyl phenyl phosphide, and reaction was conducted at 60° C. for 23 hours. The supernatant liquid was removed, and 20 mL of 2-propanol was added dropwise over 1 hour. The supernatant liquid was subjected to decantation, washed with 20 mL of THF for three times, 20 mL of ion exchange water for three times, and 20 mL of acetone, and dried with reduced pressure for 18 hours at 60° C. to obtain resin fine particles (III) represented by the following formula. The phosphorous content of the surface of the obtained resin fine particles (III) was measured as like in Example 1 and was found to be 3.85 mmol/g.

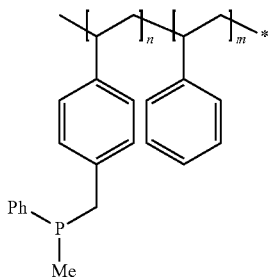

In the formula above, the value of n is 100% and the value of m is 0%, based on the total of 100% of the values of n and m.

0.21 mmol of the obtained resin fine particles (III) and 0.05 mmol of bis(1,5-cyclooctadiene)nickel (0) were subjected to reaction in a reaction vessel for 4 hours at 25° C. in the presence of THF to obtain a complex compound (III).

Figure 3:
FIG. 3 represents an IR spectrum of resin fine particles (III).

The obtained resin fine particles (III) were measured by IR. The obtained IR spectrum is shown in FIG. 3. When the IR spectrum was confirmed, it was found that a peak (wave number: 1295 cm$^{-1}$) derived from C—Cl contained in the raw material, Merrifield resin has disappeared and a peak (wave number: 694 cm$^{-1}$) derived from P—C has generated. In addition, it was confirmed that vinylphosphorus was generated by coordinating with Ni in the above. It can be said from these results that chemical bonding of phosphorous had been formed on the surface of the resin fine particles.

Example 4

In a nitrogen atmosphere, 20 g of Merrifield resin (5.5 mmol Cl/g, crosslinking agent: 5 mol % of divinylbenzene, particle size 16-50 mesh, manufactured by Sigma-Aldrich Japan Godo Kaisha) and 50 mL of triethyl phosphite ((EtO)$_3$P) were added into a reaction vessel, and the mixture was heated and stirred for 20 hours at 130° C. The precipitate was collected from the reaction solution which was cooled to room temperature, and washed five times with 20 mL of acetone, three times with 20 mL of water, and three times with 20 mL of acetone to obtain 25.08 g of light yellow resin fine particles. Subsequently, 1.0 g of the obtained resin and 8.46 mL of lithium aluminum hydride (1 mol/LTHF solution) were subjected to reaction at 25° C. for 2 days. After slowly adding 2 mL of methanol to the reaction solution, the supernatant was decanted, washed with 5 mL of 10% by mass aqueous sodium hydroxide solution for six times, with 5 mL of water for five times, and dried with reduced pressure at 60° C. for 18 hours to obtain resin fine particles (IV) represented by the following formula. The theoretical phosphorus content of the surface of the obtained resin fine particles (IV) was 4.80 mmol/g.

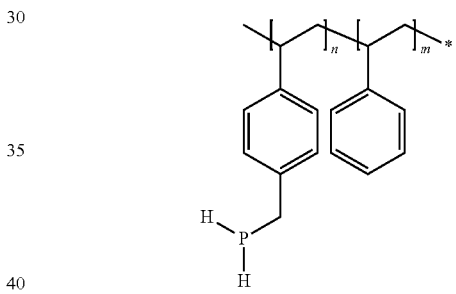

In the above described formula, the value of n is 100% and the value of m is 0%, based on the total of 100% of the values of n and m.

In a reaction vessel, 2.8 mmol of the obtained resin fine particles (IV) and 0.7 mmol of bis(1,5-cyclooctadiene) nickel (0) were subjected to reaction in the presence of 2 mL of THF at 25° C. for 18 hours, and the precipitate was collected and washed three times with 1.0 mL of THF, thereby obtaining a complex compound (IV).

Figure 4:
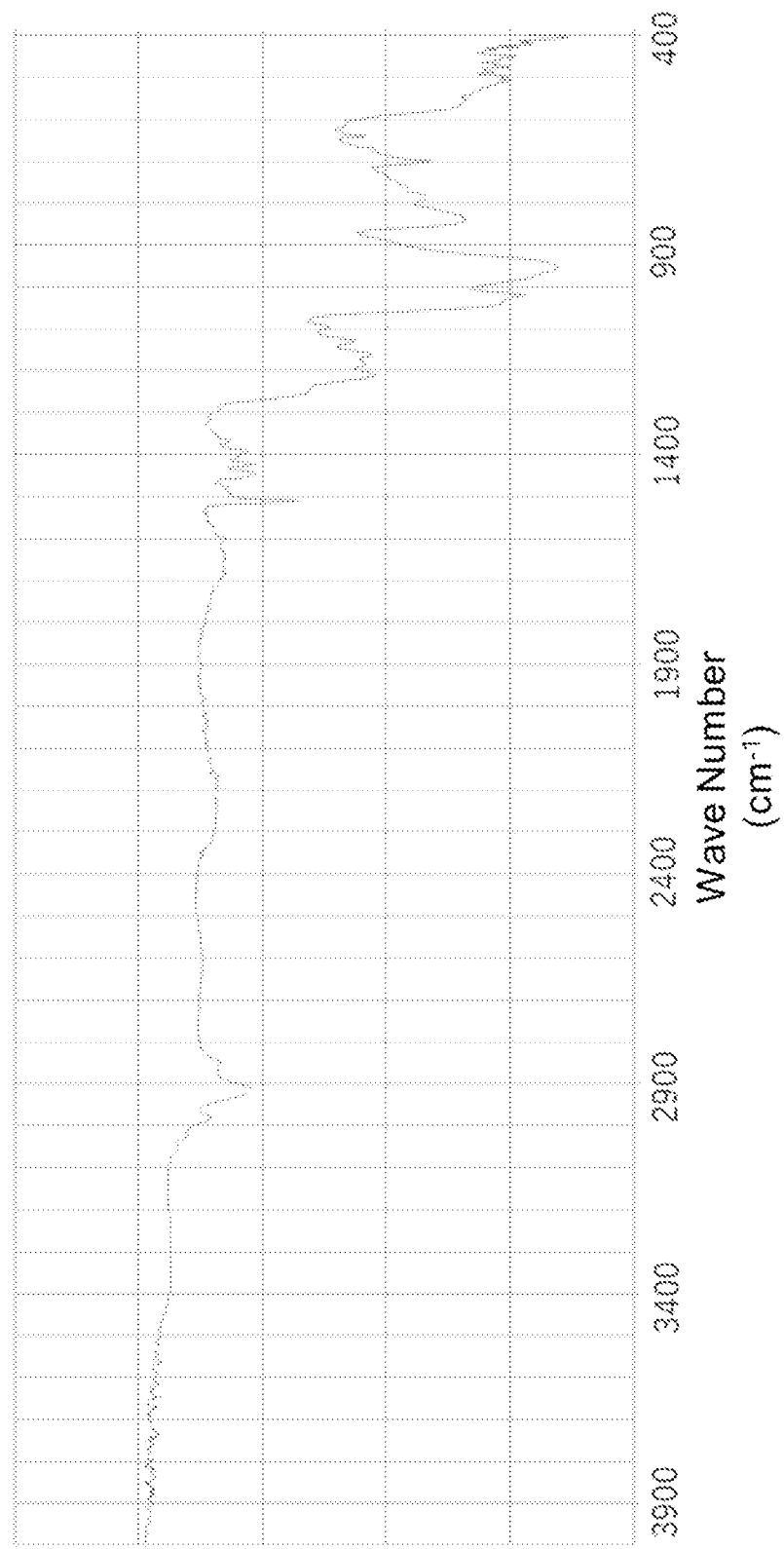
FIG. 4 represents an IR spectrum of an oxidation-treated product of resin fine particles (IV).

100 mg of the obtained resin fine particles (IV) were treated with 5.0 mL of 5% hydrogen peroxide solution, and measured by IR. The IR spectrum thus obtained is shown in FIG. 4. When the IR spectrum was confirmed, it was found that a peak (wave number: 1295 cm$^{-1}$) derived from C—Cl contained in the raw material, Merrifield resin has disappeared and a peak (wave number: 703 cm$^{-1}$) derived from P—C and a peak (wave number: 1025 cm$^{-1}$) derived from P(O)—OH have generated. In addition, it was confirmed that vinylphosphorus was generated by coordination with Ni as above. From these results, it can be said that coordination of phosphorus and nickel is formed on the surface of the resin fine particles.

Comparative Example 1

In a reaction vessel, 1 mL of trimethylphosphine (1.0 mol/L THF solution, manufactured by Sigma-Aldrich Japan Godo Kaisha) and 68.75 mg of bis(1,5-cyclooctadiene) nickel (0) were subjected to reaction at 0° C. for 1 hour. This THF solution was distilled under reduced pressure to remove the solvent, thereby obtaining a complex compound (V).

Comparative Example 2

200 mg of 4-Diphenylphosphinomethyl polystyrene resin cross-linked with 2% DVB (200-400 mesh) (0.5-1.0 mmol/g) (Catalogue No. D2766, manufactured by Tokyo Chemical Industry Co., Ltd.) and 13.8 mg of bis(1,5-cyclooctadiene) nickel (0) were metered in a reaction vessel, 1 mL of THF was added, and the mixture was stirred at 25° C. for 18 hours. The supernatant was decanted and the precipitate was washed 3 times with 0.5 mL of THF to give a complex compound (VI).

<Synthesis of Alkenylphosphorus Compound>

Synthesis Example 1

300 mmol of a phosphorus compound $((MeO)_2P(O)H)$ was metered into a reaction vessel as a starting material, and 1.5 mmol of a complex compound (I) was added. An acetylene balloon was attached to the reaction apparatus, and reaction was conducted at 60° C. for 4 hours to obtain an alkenylphosphorus compound $((MeO)_2P(O)CH=CH_2)$. The amount of alkenylphosphorus compound generated was measured by an internal standard method (standard material: diphenyl ether) using a GC-FID, and the amount of alkenylphosphorus compound generated was 1.46 g per 1 mmol of Ni.

Synthesis Example 2

An alkenylphosphorus compound $((MeO)_2P(O)CH=CH_2)$ was obtained in the same manner as in Synthesis Example 1 except that 1.5 mmol of the complex compound (II) synthesized above was used as a catalyst. The amount of alkenylphosphorus compound generated per 1 mmol of Ni was 2.11 g.

Synthesis Example 3

An alkenyl phosphorus compound $((MeO)_2P(O)CH=CH_2)$ was obtained in the same manner as in Synthesis Example 2 except that the reaction temperature was changed to 80° C. The amount of alkenyl phosphorus compound generated per 1 mmol of Ni was 4.57 g.

Synthesis Example 4

An alkenylphosphorus compound $((MeO)_2P(O)CH=CH_2)$ was obtained in the same manner as in Synthesis Example 1, except that 1.5 mmol of the complex compound (III) synthesized above was used as a catalyst. The amount of the alkenylphosphorus compound generated per 1 mmol of Ni was 3.48 g.

Synthesis Example 5

An alkenylphosphorus compound $((MeO)_2P(O)CH=CH_2)$ was obtained in the same manner as in Synthesis Example 1 except that 1.5 mmol of the complex compound (IV) synthesized above was used as a catalyst. The amount of the alkenylphosphorus compound generated per 1 mmol of Ni was 2.81 g.

Synthesis Example 6 (Comparative)

An alkenyl phosphorus compound $((MeO)_2P(O)CH=CH_2)$ was obtained in the same manner as in Synthesis Example 1 except that 1.5 mmol of the complex compound (V) synthesized above was used as a catalyst. The amount of the alkenyl phosphorus compound generated per 1 mmol of Ni was 0.08 g.

The results of the above Synthesis Examples 1-6 are listed in Table 1.

TABLE 1

| | Starting Substance (Phosphorous Compound) | Starting Substance (Alkynyl Compound) | Catalyst | Reaction Temperature (° C.) | Synthesized Substance (Alkenyl Phosphorus Compound) | Amount of Alkenyl Phosphorus Compound Generated (g/catalyst mmol) |
|---|---|---|---|---|---|---|
| Synthesis Ex. 1 | $(MeO)_2P(O)H$ | Acetylene | Complex Compound (I) | 60 | $(MeO)_2P(O)CH=CH_2$ | 1.46 |
| Synthesis Ex. 2 | $(MeO)_2P(O)H$ | Acetylene | Complex Compound (II) | 60 | $(MeO)_2P(O)CH=CH_2$ | 2.11 |
| Synthesis Ex. 3 | $(MeO)_2P(O)H$ | Acetylene | Complex Compound (II) | 80 | $(MeO)_2P(O)CH=CH_2$ | 4.57 |
| Synthesis Ex. 4 | $(MeO)_2P(O)H$ | Acetylene | Complex Compound (III) | 60 | $(MeO)_2P(O)CH=CH_2$ | 3.48 |
| Synthesis Ex. 5 | $(MeO)_2P(O)H$ | Acetylene | Complex Compound (IV) | 60 | $(MeO)_2P(O)CH=CH_2$ | 2.81 |
| Synthesis Ex. 6 (Comp) | $(MeO)_2P(O)H$ | Acetylene | Complex Compound (V) | 60 | $(MeO)_2P(O)CH=CH_2$ | 0.08 |

Synthesis Example 7

1 mmol of a phosphorus compound $((MeO)_2P(O)H)$, 1 mmol of an alkynyl compound (1-octyne), and 1 mL of THF were metered into a glass Schlenk, and 0.05 mmol of a complex compound (I) was added. The mixture was heated and stirred at 60° C. for 3 hours to obtain an alkenylphosphorus compound (a mixture of 30%:$(MeO)_2P(O)CH=CC_6H_{13}$ and 70%:$(MeO)_2P(O)C(C_6H_{13})=CH_2$). The amount of alkenylphosphorus compound generated per 1 mmol of Ni was 4.40 g.

Synthesis Example 8

An alkenylphosphorus compound (a mixture of 64%: $(MeO)_2P(O)CH=CH\text{-}Ph$ and 36%:$(MeO)_2P(O)CH(Ph)=CH_2$) was obtained in the same manner as in Synthesis Example 7, except that phenylacetylene was used as the alkynyl compound of the starting substance. The amount of alkenylphosphorus compound generated per 1 mmol of Ni was 1.27 g.

Synthesis Example 9

An alkenylphosphorus compound (a mixture of 37%: $(MeO)_2P(O)CH=CH-C(CH_3)_2OH$ and 63%: $(MeO)_2P(O)C(C(CH_3)_2OH)=CH_2$) was obtained in the same manner as in Synthesis Example 7, except that 2-methyl-3-butyn-2-ol was used as the alkynyl compound of the starting substance. The amount of alkenylphosphorus compound generated per 1 mmol of Ni was 1.67 g.

Synthesis Example 10

An alkenyl phosphorus compound (a mixture of 11%: $(CF_3CH_2O)_2P(O)CH=CH-C_6H_{13}$ and 89%: $(CF_3CH_2O)_2P(O)C(C_6H_{13})=CH_2$) was obtained in the same manner as in Synthesis Example 7, except that $(CF_3CH_2O)_2P(O)H$ was used as the phosphorus compound of the starting substance. The amount of alkenylphosphorus compound produced per 1 mmol of Ni was 4.06 g.

Synthesis Example 11 (Comparative)

The reaction was carried out under the same conditions as in Synthesis Example 7 except that the complex compound (VI) was used instead of the complex compound (I); however, a product was not obtained and only an oligomer of 1-octyne was obtained.

A list of results from the above Synthesis Examples 7-10 are indicated in Table 2.

TABLE 2

| | Starting Substance (Phosphorus Compound) | Starting Substance (Alkynyl Compound) | Catalyst | Reaction Temperature (° C.) | Synthetic Substance (Alkenylphosphorus Compound) | Amount of Alkenylphosphorus Compound Generated (g/catalyst mmol) |
|---|---|---|---|---|---|---|
| Synthesis Ex. 7 | $(MeO)_2P(O)H$ | 1-octyne | Complex Compound (I) | 60 | $(MeO)_2P(O)CH=CHC_6H_{13}$ $(MeO)_2P(O)C(C_6H_{13})=CH_2$ | 4.40 |
| Synthesis Ex. 8 | $(MeO)_2P(O)H$ | Phenyl acetylene | Complex Compound (I) | 60 | $(MeO)_2P(O)CH=CH-Ph$ $(MeO)_2P(O)C(Ph)=CH_2$ | 1.27 |
| Synthesis Ex. 9 | $(MeO)_2P(O)H$ | 2-methyl-3-butyn-2-ol | Complex Compound (I) | 60 | $(MeO)_2P(O)CH=CHC(CH_3)_2OH$ $(MeO)_2P(O)C(C(CH_3)_2OH)=CH_2$ | 1.67 |
| Synthesis Ex. 10 | $(CF_3CH_2O)_2P(O)H$ | 1-octyne | Complex Compound (I) | 60 | $(CF_3CH_2O)_2P(O)CH=CHC_6H_{13}$ $(CF_3CH_2O)_2P(O)C(C_6H_{13})=CH_2$ | 4.06 |

The invention claimed is:

1. A complex compound comprising a resin fine particle represented by the following general formula (1):

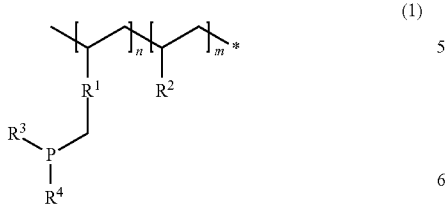

(1)

wherein, $R^1$ represents a substituted or unsubstituted phenylene group, $R^2$ represents a substituted or unsubstituted alkyl group or a substituted or unsubstituted aryl group, $R^3$ and $R^4$ each independently represent a hydrogen atom, a substituted or unsubstituted alkyl group having 1 to 8 carbons or a substituted or unsubstituted aryl group having 5 to 12 carbons, and based on the total of 100% of the values of n and m, the value of n is within the range of 20 to 100%, the value of m is within the range of 0 to 80%, and * represents a position of bonding with a surface of the resin fine particle, and a transition metal in the resin fine particle which is nickel, and wherein the phosphorous content of the surface of the fine resin particle is 1.3 mmol/g or more, and wherein the mol ratio of the phosphine group of formula (1) to the transition metal in the resin fine particle is from 10:1 to 2:1.

2. The complex compound according to claim 1, wherein the mol ratio of the phosphine group of formula (1) to the transition metal in the resin fine particle is from 8:1 to 2:1.

3. The complex compound according to claim 1, wherein $R^2$ in general formula (1) is an alkyl group having 1 to 8 carbons or an aryl group having 5 to 12 carbons.

4. The complex compound according to claim 1, used as a catalyst for a hydrophosphorylation reaction.

5. The complex compound according to claim 1, wherein $R^3$ and $R^4$ in general formula (1) each independently represent a hydrogen atom, methyl group or a phenyl group.

6. The complex compound according to claim 5, wherein based on the total of 100% of the values of n and m, the value of n is within the range of 50 to 100%, the value of m is within the range of 0 to 50%.

7. The complex compound according to claim 5, wherein based on the total of 100% of the values of n and m, the value of n is 100%, the value of m is 0%.

8. The complex compound according to claim 1, wherein the resin fine particle is represented by any one of the following formula:

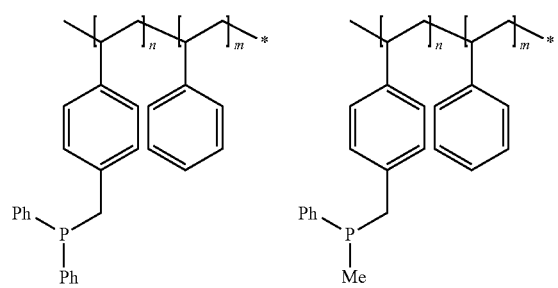

-continued

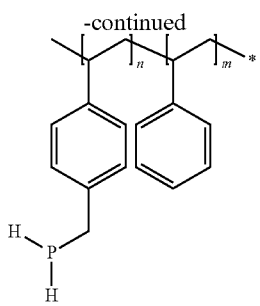

wherein, based on the total of 100% of the values of n and m, the value of n is within the range of 20 to 100%, the value of m is within the range of 0 to 80%, and * represents a position of bonding with the surface of the resin fine particle.

9. The complex compound according to claim 8, wherein based on the total of 100% of the values of n and m, the value of n is within the range of 50 to 100%, the value of m is within the range of 0 to 50%.

10. The complex compound according to claim 8, wherein based on the total of 100% of the values of n and m, the value of n is 100%, the value of m is 0%.

11. The complex compound according to claim 10, wherein
the phosphorous content of the surface of the fine resin particles is 2.0 mmol/g or more.

12. The complex compound according to claim 10, wherein
the phosphorous content of the surface of the fine resin particle is 2.5 mmol/g or more.

13. The complex compound according to claim 1, wherein based on the total of 100% of the values of n and m, the value of n is within the range of 50 to 100%, the value of m is within the range of 0 to 50%.

14. The complex compound according to claim 1, wherein based on the total of 100% of the values of n and m, the value of n is 100%, the value of m is 0%.

15. The complex compound according to claim 1, wherein the phosphorous content of the surface of the fine resin particles is 2.0 mmol/g or more.

16. The complex compound according to claim 1, wherein the phosphorous content of the surface of the fine resin particle is 2.5 mmol/g or more.

17. A method for manufacturing a complex compound, comprising the step of reacting a resin fine particle represented by the following general formula (1):

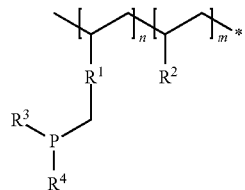

(1)

wherein, $R^1$ represents a substituted or unsubstituted phenylene group, $R^2$ represents a substituted or unsubstituted alkyl group or a substituted or unsubstituted aryl group, $R^3$ and $R^4$ each independently represent a hydrogen atom, a substituted or unsubstituted alkyl group having 1 to 8 carbons or a substituted or unsubstituted aryl group having 5 to 12 carbons, and based on the total of 100% of the values of n and m, the value of n is within the range of 20 to 100%, the value of m is within the range of 0 to 80%, and * represents a position of bonding with a surface of the resin fine particle,
with a transition metal compound which is nickel, in the presence of an organic solvent,
wherein the phosphorous content of the surface of the fine resin particle is 1.3 mmol/g or more, and wherein the mol ratio of the phosphine group of formula (1) to the transition metal in the resin fine particle is from 10:1 to 2:1.

18. The manufacturing method according to claim 17, wherein
the transition metal compound is a zero valent nickel compound.

19. The manufacturing method according to claim 18, wherein
the zero valent nickel compound is at least one selected from the group consisting of bis(1,5-cyclooctadiene) nickel (0), tetrakis (triphenylphosphine) nickel (0), and nickel carbonyl.

* * * * *